(12) United States Patent
Youn (10) Patent No.: US 9,421,881 B2
(45) Date of Patent: Aug. 23, 2016

(54) APPARATUS AND METHOD FOR CONTROLLING CHARGE OF BATTERY

(71) Applicant: HYUNDAI MOTOR COMPANY, Seoul (KR)

(72) Inventor: Kil-Young Youn, Suwon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 45 days.

(21) Appl. No.: 14/329,699

(22) Filed: Jul. 11, 2014

(65) Prior Publication Data
US 2015/0183335 A1 Jul. 2, 2015

(30) Foreign Application Priority Data
Dec. 26, 2013 (KR) .......................... 10-2013-0163834

(51) Int. Cl.
*B60L 11/18* (2006.01)
(52) U.S. Cl.
CPC ......... *B60L 11/1862* (2013.01); *B60L 11/1811* (2013.01); *Y02T 10/7005* (2013.01)
(58) Field of Classification Search
CPC ............ B60L 11/1811; B60L 11/1868; B60L 11/1881; B60L 11/184; H01M 8/04559; B60K 6/365; G01R 31/3651; B60H 1/00007
USPC ............. 701/22; 307/9.1; 320/101; 429/415; 702/63; 62/7
See application file for complete search history.

(56) References Cited

U.S. PATENT DOCUMENTS

| | | | |
|---|---|---|---|
| 5,678,410 A * | 10/1997 | Fujita ................. | B60H 1/00007 165/104.12 |
| 6,520,273 B1 * | 2/2003 | Ishikawa ............. | B60L 11/1881 429/415 |
| 6,630,813 B2 | 10/2003 | Berels et al. | |
| 8,880,264 B2 * | 11/2014 | Saito ..................... | B60L 11/184 701/22 |
| 2007/0138996 A1 * | 6/2007 | Kobayashi ........ | H01M 8/04559 320/101 |
| 2009/0024338 A1 * | 1/2009 | Suzuki ............... | G01R 31/3651 702/63 |
| 2012/0072066 A1 * | 3/2012 | Kato ...................... | B60K 6/365 701/22 |
| 2012/0223575 A1 | 9/2012 | Hachiya et al. | |
| 2012/0306263 A1 * | 12/2012 | Tashiro ............... | B60L 11/1868 307/9.1 |

FOREIGN PATENT DOCUMENTS

| | | |
|---|---|---|
| JP | 10-2009-0059175 A | 6/2009 |
| JP | 2012-249462 A | 12/2012 |
| JP | 10-2013-0082360 A | 7/2013 |
| KR | 10-2006-0000647 A | 1/2006 |
| KR | 10-1028020 B1 | 4/2011 |

* cited by examiner

*Primary Examiner* — Yuri Kan
(74) *Attorney, Agent, or Firm* — McDermott Will & Emery LLP (57) ABSTRACT

An apparatus for controlling charge of a battery includes an auxiliary battery, a vehicle controller configured to determine a control mode of the auxiliary battery according to driving conditions of a vehicle, a DC converter configured to measure a state of the auxiliary battery and use the measured state of the battery to perform battery current control of the auxiliary battery according to the determined control mode, and a high voltage battery configured to supply power to the DC converter for charging or discharging the auxiliary battery.

18 Claims, 6 Drawing Sheets

APPARATUS AND METHOD FOR CONTROLLING CHARGE OF BATTERY

CROSS-REFERENCE TO RELATED APPLICATION

This application claims priority to Korean Patent Application No. 10-2013-0163834, filed on Dec. 26, 2013, the entire content of which is incorporated herein by reference.

TECHNICAL FIELD

The present inventive concept relates to a battery charging technique, and particularly, to an apparatus and a method for controlling charge of a battery, which control charge of a battery according to electronic loads and/or states of the battery during power supply to a DC converter in consideration of structural merits of an eco-friendly vehicle and/or basic characteristics of the battery.

BACKGROUND

An auxiliary battery for a vehicle generally has a short service life of 2-3 years due to frequent charge and discharge thereof. On the other hand, an auxiliary battery of an eco-friendly vehicle has a low load during starting of the vehicle and is rapidly and accurately controllable by means of using a low voltage DC-DC converter (LDC), compared to the auxiliary battery of a typical engine vehicle. However, despite these structural merits, the auxiliary battery of the eco-friendly vehicle is managed similarly to the auxiliary battery of the engine vehicle in the absence of operational strategies of the auxiliary battery.

In other words, variable voltage control of the LDC is performed by setting a given control voltage at the request of a vehicle controller.

Figure 1:
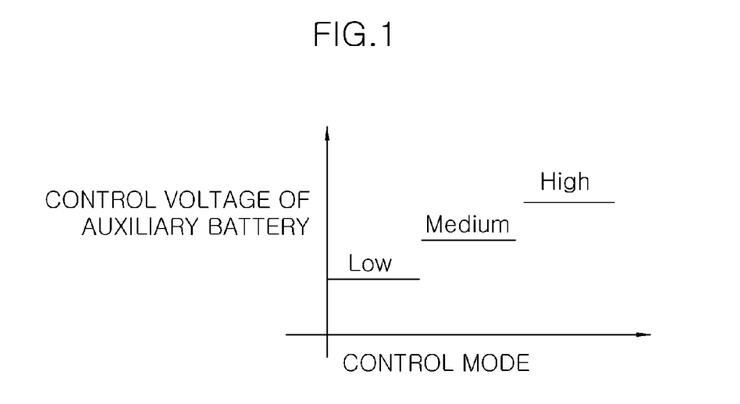
FIG. 1 is a graph illustrating a typical concept of performing variable voltage control of an LDC using a control voltage for each mode.

Referring to FIG. 1, the control voltage is configured as a low (fuel efficiency/discharge) mode, a medium (fuel efficiency/charge) mode, and a high (charge) mode. That is, generally, the low mode is applied during a discharge mode of the auxiliary battery in consideration of fuel efficiency, the medium mode is applied during a charge mode in consideration of fuel efficiency, and the high mode is applied during a typical charge mode.

In this case, durability of the auxiliary battery and fuel efficiency of the vehicle may be poor since a fixed step voltage unrelated to characteristics of the battery is applied to the battery when a variable control mode of the auxiliary battery is performed. As a result, the battery is charged under a current region of low efficiency for a certain time. In other words, structural merits of the eco-friendly vehicle, load characteristics of the battery, and/or states of the battery are not considered in performing continuous charge of current during transition between the modes or during charge in the same mode.

One measure to solve these problems is disclosed in the document of Korean Patent Laid-Open Publication No. 10-2013-0082360. In the above document, an output voltage of a low voltage converter is variably controlled using state information of a low voltage battery sensed by a low voltage battery sensor and using information of a driven load sensed by a current sensor.

However, in the document, structural merits of the eco-friendly vehicle, load characteristics of the battery, and/or states of the battery are not considered because of using a voltage control mode.

SUMMARY

An aspect of the present inventive concept is directed to an apparatus and a method for controlling charge of a battery, which perform variable control of a DC converter in consideration of structural merits of an eco-friendly vehicle and/or states of a battery.

Another aspect of the present inventive concept is directed to an apparatus and a method for controlling charge of a battery, which control charge of a battery according to electronic loads and/or states of the battery during power supply thereof so as to increase durability of an auxiliary battery and improve fuel efficiency of a vehicle.

To achieve the above objects, the present inventive concept provides an apparatus for controlling charge of a battery, which performs variable control of a DC converter in consideration of structural merits of an eco-friendly vehicle and/or states of a battery.

One aspect of the present inventive concept relates to an apparatus for controlling charge of a battery including an auxiliary battery, a vehicle controller configured to determine a control mode of the auxiliary battery according to driving conditions of a vehicle, a DC converter configured to measure a state of the auxiliary battery and use the measured state of the battery to perform battery current control of the auxiliary battery according to the determined control mode, and a high voltage battery configured to supply power to the DC converter for charging or discharging the auxiliary battery.

The DC converter may be configured to perform the battery current control when the control mode is a fuel efficiency/charge mode.

The DC converter may be configured to charge the auxiliary battery only when charge efficiency of the auxiliary battery is high efficiency.

The DC converter may be configured to charge the auxiliary battery when an input current for charging the auxiliary battery is less than or equal to a first reference value in which the charge efficiency of the auxiliary battery is high.

The DC converter may be configured to charge the auxiliary battery only when an output current of the DC converter is a high current.

The output current of the DC converter for charging the auxiliary battery may be more than or equal to a second reference value in which the output current of the DC converter is a high current.

The battery may be in at least one of a State of Charge (SOC), a State of Health (SOH), and a state of temperature information.

The battery current control may be defined by an equation of $I_b = (V_b - V_{OCV})/R_b$, (where $I_b$ refers to an input current of the auxiliary battery, $R_b$ refers to an internal resistance of the auxiliary battery, $V_b$ refers to a voltage applied to the auxiliary battery, and $V_{OCV}$ refers to an internal voltage of the auxiliary battery).

An output current of the DC converter may be defined by an equation of $I_{LDC} = I_L + I_b$ (where $I_{LDC}$ refers to the output current of the DC converter, and $I_L$ refers to a required load of the vehicle), and the required load ($I_L$) of the vehicle may be uniformly maintained under the fuel efficiency/charge mode.

The required load ($I_L$) of the vehicle may be more than or equal to a second reference value in which the output current of the DC converter is a low current.

Another aspect of the present inventive concept encompasses a method for controlling charge of a battery includes determining a control mode of an auxiliary battery according to driving conditions of a vehicle. A state of the auxiliary battery is measured. Battery current control of the auxiliary battery is performed according to the determined control mode using the measured state of the battery. The battery is charged or discharged according to the battery current control.

BRIEF DESCRIPTION OF THE DRAWINGS

The above and other objects, features and advantages of the present inventive concept will be more apparent from the following detailed description taken in conjunction with the accompanying drawings, in which like reference characters may refer to the same or similar parts throughout the different views. The drawings are not necessarily to scale, emphasis instead being placed upon illustrating the principles of the embodiments of the inventive concept.

DETAILED DESCRIPTION

Exemplary embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present inventive concept to those skilled in the art. Therefore, it should be understood that the scope and spirit of the present inventive concept can be extended to all variations, equivalents, and replacements in addition to the appended drawings of the present inventive concept.

Throughout the disclosure, like reference numerals refer to like parts throughout the various figures and embodiments of the present inventive concept.

Furthermore, the terms including expressions, such as first and/or second, used in the specification of the present inventive concept may be used to describe various elements of the present inventive concept. However, the elements of the present inventive concept should not be limited by the terms used in the specification of the present inventive concept. In other words, such terms will be used only to differentiate one element from other elements of the present inventive concept.

For example, without deviating from the scope and spirit of the present inventive concept, a first element may be referred to as a second element, and, similarly, a second element may also be referred to as a first element. As used herein, the term "and/or" includes any and all combinations of one or more of the associated listed items.

Unless otherwise defined, all terms, including technical and scientific terms, used herein have the same meaning as commonly understood by one of ordinary skill in the art.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an apparatus and a method for controlling charge of a battery according to an embodiment of the present inventive concept will be described below in more detail with reference to the accompanying drawings.

Figure 2:
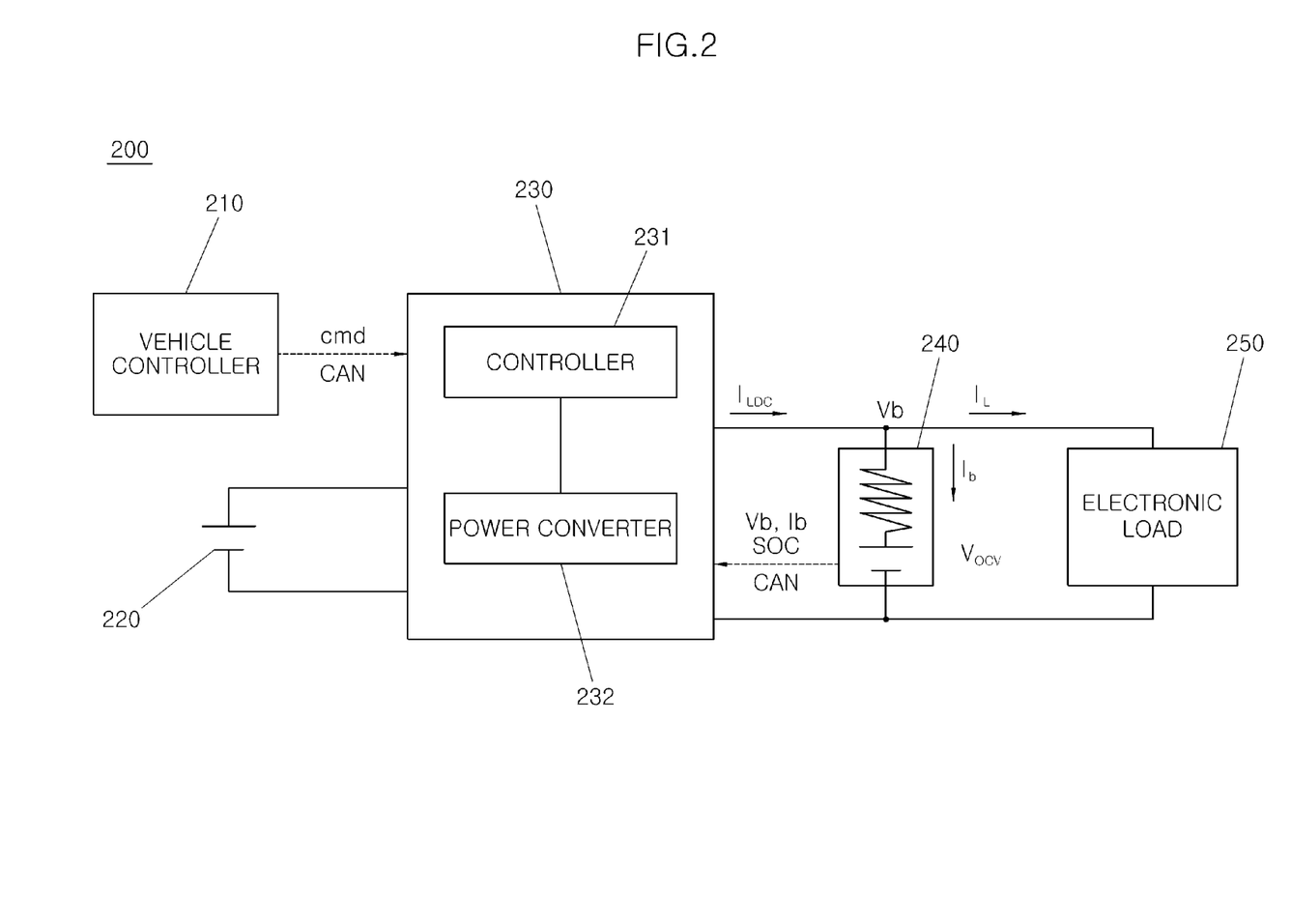
FIG. 2 is a view illustrating a configuration of an apparatus for controlling charge of a battery, which charges a battery under a low current in consideration of states of the battery by a change from a voltage control mode to a current control mode during charge of the battery according to an embodiment of the present inventive concept.

FIG. 2 is a view illustrating a configuration of an apparatus 200 for controlling charge of a battery. The apparatus 200 may be configured to charge a battery under a low current in consideration of states of the battery by a change from a voltage control mode to a current control mode during charge of the battery according to an embodiment of the present inventive concept. Referring to FIG. 2, the apparatus 200 may include an auxiliary battery 240, a vehicle controller 210, a DC converter 230, and a high voltage battery 220. The auxiliary battery 240 may be charged and/or discharged to supply power to an electronic load 250. The vehicle controller 210 may be configured to determine a control mode of the auxiliary battery 240 according to driving conditions of a vehicle. The DC converter 230 may be configured to measure a state of the auxiliary battery 240 and use the measured state of the battery so as to perform battery current control of the auxiliary battery 240 according to the control mode. The high voltage battery 220 may supply charge or discharge power to the DC converter 230, e.g., supplying power to the DC converter 230 for charging or discharging the auxiliary battery 240.

The vehicle controller 210 may be configured to control the entirety of the vehicle to transmit the control mode of the auxiliary battery 240 to the DC converter 230 via CAN (Controller Area Network) communication according to the driving conditions of the vehicle. Of course, the vehicle controller 210 may include a microprocessor, a memory, and the like for such an algorithm. Here, the control mode may be configured of a fuel efficiency/discharge mode, a fuel efficiency/charge mode, and a charge mode.

The DC converter 230 may be configured to charge and/or discharge the auxiliary battery 240 by performing the control mode of the auxiliary battery 240 and/or battery current control in consideration of battery states such as a State of Charge (SOC), a State of Health (SOH), and a temperature condition of the auxiliary battery 240.

To this end, the DC converter 230 may include a battery controller 231 performing the control mode and/or the battery current control and a power converter 232 which converts an output current and an output voltage to the auxiliary battery 240 and input power from the high voltage battery 220 according to control of the battery controller 231. In other words, the DC converter 230 may be a low voltage DC-DC converter (LDC) which converts a high voltage into a low voltage.

To this end, the battery controller 231 may include a microprocessor, a memory, and the like. The memory may also be included in the microprocessor or may also be used as a separate memory.

The high voltage battery 220 may include battery cells (not shown) configured in series and/or in parallel. The battery cells may be a battery for an eco-friendly vehicle, for example, a nickel-metal battery or a lithium-ion battery.

Here, an example of the electric vehicle may include an electric vehicle (EV), a hybrid electric vehicle (HEV), a plug-in hybrid electric vehicle (PHEV), a fuel cell vehicle, etc.

The auxiliary battery 240 may supply power of about 12V to an electronic load 250 installed within the vehicle. To this end, the auxiliary battery 240 may be charged and/or discharged.

Figure 4:
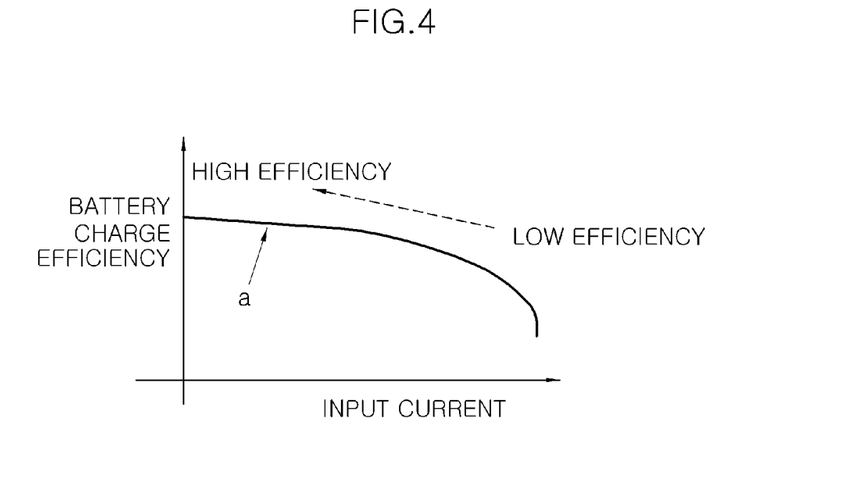
FIG. 4 is a graph illustrating a typical relationship between an input current and battery charge efficiency.

The battery current control may be performed under the fuel efficiency/charge mode, and a condition state (namely, referred to as a steady state) for performing the battery current control is as follows:

1) In the auxiliary battery 240, battery charge efficiency may be changed from high efficiency to low efficiency according to an input current (namely, a charge current) inputted to the auxiliary battery 240, as shown in FIG. 4. That is, since the battery charge efficiency is decreased when the input current is more than or equal to a preset first reference value a (see FIG. 4), the auxiliary battery 240 may be charged only when the input current is more than or equal to the reference value a; and 2) Since the efficiency of the DC converter 230 is low under a low current and high under a high current, the DC converter 230 may be configured to operate when the current thereof is more than or equal to a preset second reference value b (see FIG. 5). The input current is represented by the following equation.

$$I_b = (V_b - V_{OCV})/R_b \quad \text{[Equation 1]}$$

Where $I_b$ refers to an input current of the auxiliary battery, $R_b$ refers to an internal resistance of the auxiliary battery, $V_b$ refers to a voltage applied to the auxiliary battery, and $V_{OCV}$ refers to an internal voltage of the auxiliary battery.

Figure 6:
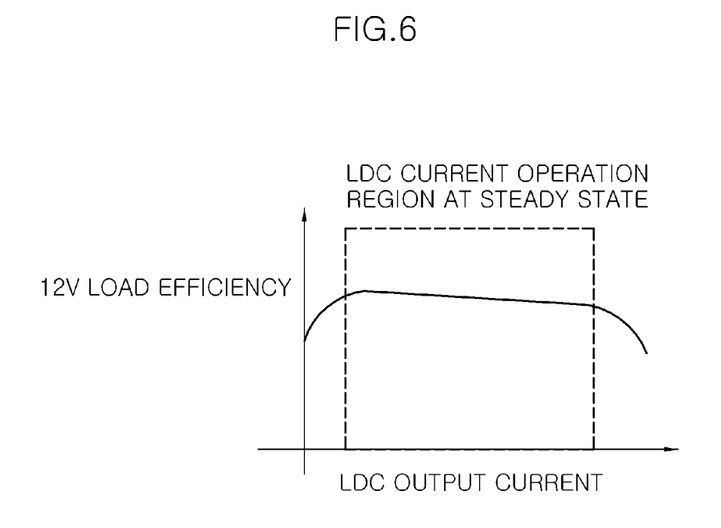
FIG. 6 is a graph illustrating a typical relationship between an output current and load efficiency of the LDC.

When the above 1) and 2) conditions are performed, 12V load efficiency of the electronic load 250 may be managed as shown in FIG. 6. That is, since a rapid increase of the current during a change to a typical mode is not controlled, charge efficiency and durability of the auxiliary battery is increased. Thus, fuel efficiency of the vehicle may be improved. An output current $I_{LDC}$ of the DC converter may be represented by the following equation.

$$I_{LDC} = I_L + I_b \quad \text{[Equation 2]}$$

Where $I_L$ refers to a required load of the vehicle.

The required load $I_L$ of the vehicle may be uniformly maintained under the fuel efficiency/charge mode.

In addition, a heating value of the auxiliary battery is represented by the following equation.

$$Q = 0.24 I_b^2 R_b \quad \text{[Equation 3]}$$

Figure 3A:
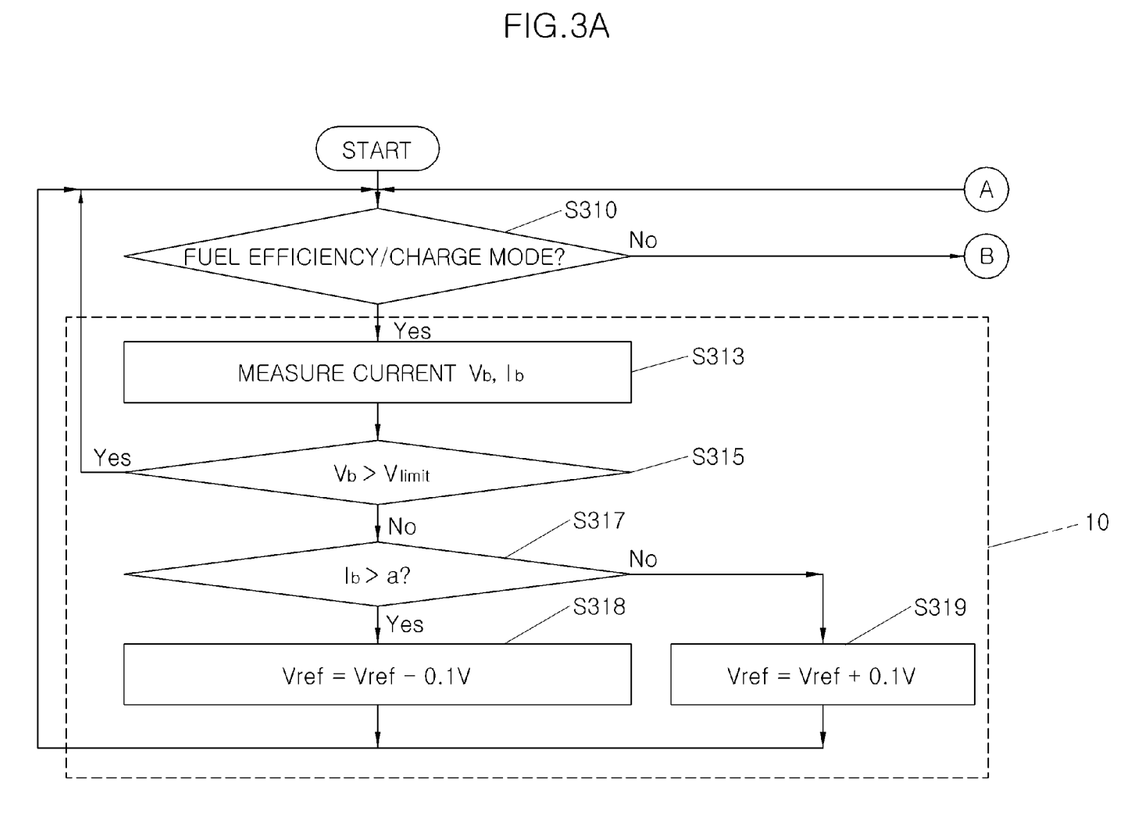
FIG. 3A and FIG. 3B are flowcharts illustrating a process of charging the battery under a low current in consideration of states of the battery by the change from the voltage control mode to the current control mode during charge of the battery according to an embodiment of the present inventive concept.
Figure 3B:
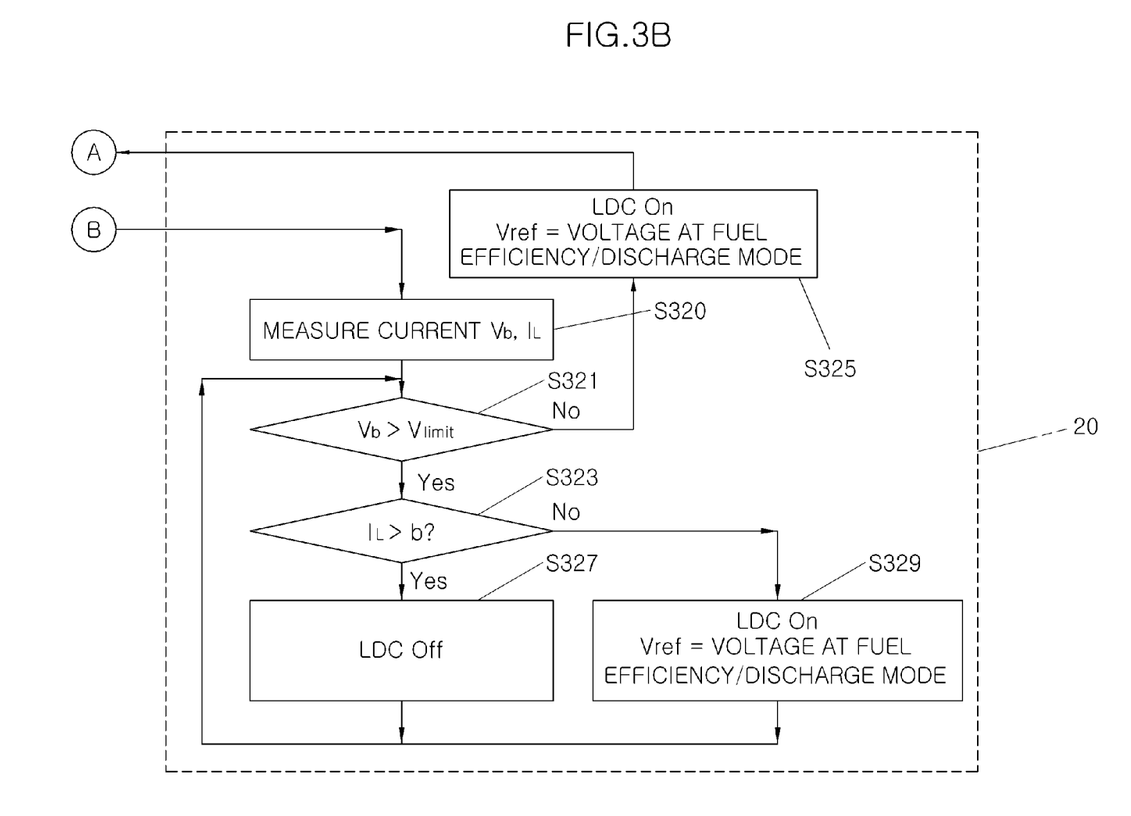

FIG. 3A and FIG. 3B are flowcharts illustrating a process of charging the battery under a low current in consideration of states of the battery by the change from the voltage control mode to the current control mode during charge of the battery according to an embodiment of the present inventive concept. Referring to FIG. 3A, the control mode of the auxiliary battery 240 may be determined according to driving conditions of the vehicle (step S310). That is, it may be identified whether the control mode is a fuel efficiency/charge mode.

When the control mode is the fuel efficiency/charge mode 10, a current applied voltage $V_b$ and an input current $I_b$ of the auxiliary battery 240 may be measured (step S313) so as to identify whether these measured values satisfy the conditions shown at steps S315, and S317, i.e., $V_b > V_{limit}$; $I_b > a$. In particular, when the current applied voltage $V_b$ is more than or equal to a preset limit value $V_{limit}$ at step S315, steps S310 to S315 may progress again.

According to the identified result, a reference voltage Vref may be decreased by a certain value, e.g., $V_{ref} = V_{ref} - 0.1V$, when the measured values satisfy the conditions, e.g., when $I_b > a$, (step S318) or a new increased reference voltage may be generated, e.g., $V_{ref} = V_{ref} + 0.1V$, when the measured values do not satisfy the conditions, e.g., when $I_b < a$ (step S319). Subsequently, steps S310 to S319 may progress again.

Referring to FIG. 3B, when the control mode is a fuel efficiency/discharge mode 20 instead of the fuel efficiency/charge mode 10 at step S310, a current applied voltage $V_b$ and a required load $I_L$ of the auxiliary battery 240 may be measured (step 320) so as to identify whether these measured values satisfy the conditions shown at steps S321 and S323. In particular, when the current applied voltage $V_b$ is lower than a preset limit value $V_{limit}$ at step S321, the DC converter 230 (see FIG. 2) may be turned on and the reference voltage Vref may be set to a voltage at the fuel efficiency/discharge mode (step S325). Subsequently, the process may progress to step S310.

On the other hand, according to the identified result, the DC converter 230 may be turned off when the measured values satisfy the conditions (step S327) or the DC converter 230 may be turned on when the measured values do not satisfy the conditions so that the reference voltage Vref is set to a voltage at the fuel efficiency/discharge mode (step S329). Subsequently, steps S321 to S329 may be repeatedly performed.

FIG. 4 is a graph illustrating a typical relationship between an input current (namely, referred to as a charge current) and battery charge efficiency. Referring to FIG. 4, the charge efficiency of the auxiliary battery 240 (see FIG. 2) is decreased from high efficiency to low efficiency according to the increase of the current. Accordingly, in order to improve the charge efficiency, the battery may be charged when the input current thereof is less than or equal to the first reference value a.

Figure 5:
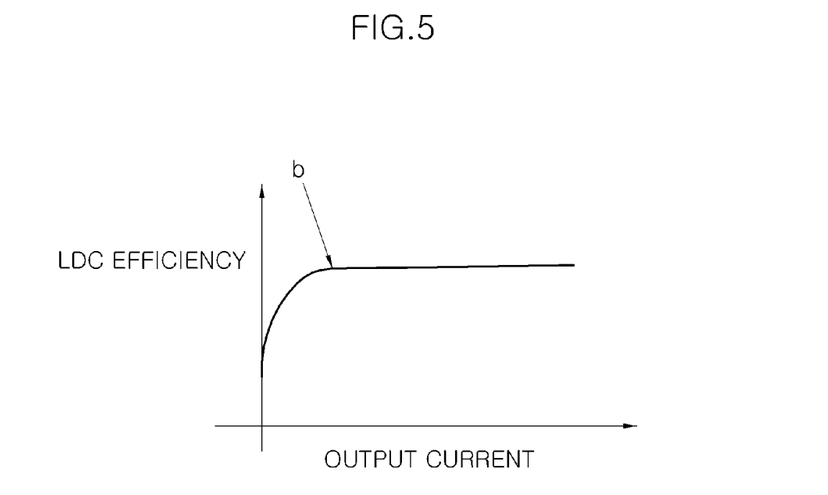
FIG. 5 is a graph illustrating a typical relationship between an output current and LDC efficiency.

FIG. 5 is a graph illustrating a typical relationship between an output current and LDC efficiency. Referring to FIG. 5, the LDC efficiency is highly maintained only when the output current of the LDC is more than or equal to the second reference value b. Accordingly, the output current of the LDC may be more than or equal to the second reference value b to maintain the LDC efficiency.

FIG. 6 is a graph illustrating a typical relationship between an output current and load efficiency of the LDC. Referring to FIG. 6, only when the DC converter is operated under the steady state, efficiency of the electronic load 250 (see FIG. 2) is uniformly maintained.

In accordance with exemplary embodiments of the present inventive concept, it may be possible to increase durability of an auxiliary battery and simultaneously improve fuel efficiency of a vehicle by increasing charge efficiency using power control of the auxiliary battery in consideration of structural merits of an eco-friendly vehicle and/or states of the battery.

In addition, since the charge control of the battery is embodied by only improving a software (S/W) algorithm without addition of a separate hardware (H/W), the present inventive concept has an economic advantage.

While the present inventive concept has been described with respect to the specific embodiments, it will be apparent to those skilled in the art that various changes and modifications may be made without departing from the spirit and scope of the inventive concept as defined in the following claims.

What is claimed is:

1. An apparatus for controlling charge of a battery, comprising:
   an auxiliary battery;
   a vehicle controller configured to determine a control mode of the auxiliary battery according to driving conditions of a vehicle;
   a DC converter configured to measure a state of the auxiliary battery and use the measured state of the battery to perform battery current control of the auxiliary battery according to the determined control mode; and
   a high voltage battery configured to supply power to the DC converter for charging or discharging the auxiliary battery,
   wherein the DC converter is configured to charge the battery when an input current for charging the auxiliary battery is less than or equal to a first reference value in which the charge efficiency of the auxiliary battery is high.

2. The apparatus of claim 1, wherein the DC converter is configured to perform the battery current control when the control mode is a fuel efficiency/charge mode.

3. The apparatus of claim 1, wherein the DC converter is configured to charge the auxiliary battery only when charge efficiency of the auxiliary battery is high.

4. The apparatus of claim 1, wherein the DC converter is configured to charge the auxiliary battery only when an output current of the DC converter is a high current.

5. The apparatus of claim 4, wherein the output current of the DC converter for charging the auxiliary battery is more than or equal to a second reference value in which the output current of the DC converter is a high current.

6. The apparatus of claim 1, wherein the battery is in at least one of a State of Charge (SOC), a State of Health (SOH), and a state of temperature information.

7. The apparatus of claim 2, wherein the battery current control is defined by an equation of $I_b=(V_b-V_{OCV})/R_b$, (where $I_b$ refers to an input current of the auxiliary battery, $R_b$ refers to an internal resistance of the auxiliary battery, $V_b$ refers to a voltage applied to the auxiliary battery, and $V_{OCV}$ refers to an internal voltage of the auxiliary battery).

8. The apparatus of claim 7, wherein an output current of the DC converter is defined by an equation of $I_{LDC}=I_L+I_b$ (where $I_{LDC}$ refers to the output current of the DC converter, and $I_L$ refers to a required load of the vehicle), and the required load ($I_L$) of the vehicle is uniformly maintained under the fuel efficiency/charge mode.

9. The apparatus of claim 8, wherein the required load ($I_L$) of the vehicle is more than or equal to a second reference value in which the output current of the DC converter is a low current.

10. A method for controlling charge of a battery, comprising:
    determining a control mode of an auxiliary battery according to driving conditions of a vehicle;
    measuring a state of the auxiliary battery;
    performing battery current control of the auxiliary battery according to the determined control mode using the measured state of the battery; and
    charging or discharging the battery according to the battery current control,
    wherein an input current for charging the auxiliary battery is less than or equal to a first reference value in which charge efficiency of the auxiliary battery is high.

11. The method of claim 10, wherein the battery current control is performed when the control mode is a fuel efficiency/charge mode.

12. The method of claim 10, wherein the auxiliary battery is charged only when charge efficiency of the auxiliary battery is high.

13. The method of claim 10, wherein the auxiliary battery is charged only when an output current of a DC converter is a high current.

14. The method of claim 13, wherein the output current of the DC converter for charging the auxiliary battery is more than or equal to a second reference value in which the output current of the DC converter is a high current.

15. The method of claim 10, wherein the battery is in at least one of a State of Charge (SOC), a State of Health (SOH), and a state of temperature information.

16. The method of claim 11, wherein the battery current control is defined by an equation of $I_b=(V_b-V_{OCV})/R_b$, (where $I_b$ refers to an input current of the auxiliary battery, $R_b$ refers to an internal resistance of the auxiliary battery, $V_b$ refers to a voltage applied to the auxiliary battery, and $V_{OCV}$ refers to an internal voltage of the auxiliary battery.

17. The method of claim 16, wherein an output current of a DC converter is defined by an equation of $I_{LDC}=I_L+I_b$ (where $I_{LDC}$ refers to the output current of the DC converter, and $I_L$ refers to a required load of the vehicle), and the required load ($I_L$) of the vehicle is uniformly maintained under the fuel efficiency/charge mode.

18. The method of claim 17, wherein the required load ($I_L$) of the vehicle is more than or equal to a second reference value in which the output current of the DC converter is a low current.

* * * * *